United States Patent [19]

King

[11] 3,967,706

[45] July 6, 1976

[54] MATERIAL HANDLING APPARATUS WITH IMPROVED FAIL-SAFE BRAKE SYSTEM

[75] Inventor: Raymond J. King, Green Bay, Wis.

[73] Assignee: Northwest Engineering Company, Green Bay, Wis.

[22] Filed: May 22, 1974

[21] Appl. No.: 472,215

[52] U.S. Cl............................ 188/170; 188/264 A; 192/3 N
[51] Int. Cl.².......................................... F16D 65/24
[58] Field of Search..... 188/264 R, 264 A, 264 AA, 188/264 B, 264 E, 170, 71.1, 71.6, 1 R, 296; 192/3 N

[56] References Cited
UNITED STATES PATENTS

| | | | |
|---|---|---|---|
| 2,356,111 | 8/1944 | Weaks et al. | 188/264 R |
| 2,487,415 | 11/1949 | Bennett | 188/264 B |
| 2,584,191 | 2/1952 | Danly et al. | 188/170 |
| 2,821,437 | 1/1958 | Lesher | 188/264 E X |
| 2,866,525 | 12/1958 | Bauer | 188/264 AA X |
| 3,334,711 | 8/1967 | Anderson | 188/296 X |
| 3,335,823 | 8/1967 | Nagel | 188/296 X |
| 3,366,211 | 1/1968 | May | 188/264 B X |
| 3,536,230 | 10/1970 | Williams | 192/3 N |
| 3,773,152 | 11/1973 | Sitton | 188/170 |

Primary Examiner—Trygve M. Blix
Assistant Examiner—Edward R. Kazenske
Attorney, Agent, or Firm—Andrus, Sceales, Starke & Sawall

[57] ABSTRACT

A material handling device, such as a crawler type crane-excavator, is provided with a fail-safe brake having a piston which is normally spring biased into brake engaging position and which is moved to brake release position by a positive control. A port in the piston end of the brake housing is connected to an external source of pressurized air. A passage through the piston rod permits flow of this air to the opposite piston side, thereby equalizing the air forces thereon. The air intimately contacts the brake elements and biasing springs and is discharged from adjacent the springs to the outside through a one-way exhaust valve. When maximum purging is desired, the air discharge is disposed in the lowermost portion of the brake housing. In addition, the pressurized air may be conditioned and also provided with a lubricant or the like therein to help maintain proper brake functioning and reduce the possibility of corrosion of the brake parts. The pressurized air supply is contemplated as being responsive to release of the brake.

1 Claim, 6 Drawing Figures

MATERIAL HANDLING APPARATUS WITH IMPROVED FAIL-SAFE BRAKE SYSTEM

BACKGROUND AND SUMMARY OF THE INVENTION

This invention relates to a material handling apparatus with an improved fail-safe brake system.

Numerous material handling devices such as crane-excavators and the like utilize a fail-safe brake for purposes of safety. Such a brake is automatically and normally biased into engaged position, and must be released by some positive action of the operator.

In a crawler type crane-excavator, a fail-safe brake is often applied to the crawler drive mechanism to prevent run-away of the machine if the operator becomes ill or accidentally mishandles the controls. Such brakes have usually been positioned low on the machine, adjacent the crawler mechanism for purposes of efficiency and machine stability.

Fail-safe brakes of the type used in heavy material handling machines have usually included a spring biased movable piston within the brake housing. A vent in the brake housing and extending between the outer end of the piston chamber and the outside has been necessary to permit piston movement and prevent lock-up of the brake mechanism. This vent has been disadvantageous in that it has permitted penetration of undesirable material into the brake housing itself, causing corrosion and undue wear of the brake. For example, crane-excavators are sometimes operated in flooded or high water areas wherein a major portion of the crawler and brake mechanism is submerged. Water and fine sludge will then pass inwardly through the vent, damaging the brake.

The concept of the present invention eliminates the need for a vent of the kind previously used, and still permits free movement of the brake piston. In addition, the invention contemplates a purging of the brake housing to remove contaminants from the brake elements, as well as lubrication of the said element, if desired.

In accordance with the invention, a port in the piston end of the brake housing is connected to an external source of pressurized air. A passage through the piston rod permits flow of this air to the opposite piston side, thereby equalizing the air forces thereon. The air intimately contacts the brake elements and biasing spring means and is discharged from adjacent the spring means to the outside through a one-way exhaust valve. When maximum purging is desired, the air discharge is disposed in the lowermost portion of the spring means. In addition, the pressurized air may be conditioned and also provided with a lubricant or the like therein to help maintain proper brake functioning and reduce the possibility of corrosion of the brake parts. The pressurized air supply is contemplated as being responsive to release of the brake.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
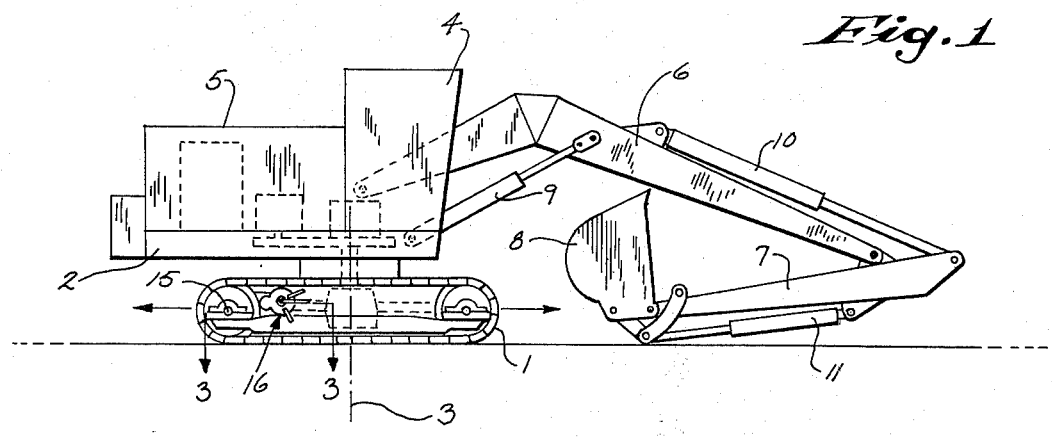
FIG. 1 is a schematic side elevation of a mobile crane-excavator which incorporates the invention.

As shown in FIG. 1 of the drawings, the concept of the invention is adaptable for use in a material handling mobile crane-excavator type device mounted on crawler treads 1 and which includes a platform 2 pivotable or swingable about an upright axis 3. Platform 2 supports an operator's cab 4 as well as a rear end enclosure 5 for equipment or the like. In this embodiment, a number of load carrying members are provided, namely: a boom 6, dipper arm 7 and dipper 8. These elements are controlled by suitable respective cylinders 9, 10, 11 actuatable from the operator's cab.

Figure 2:
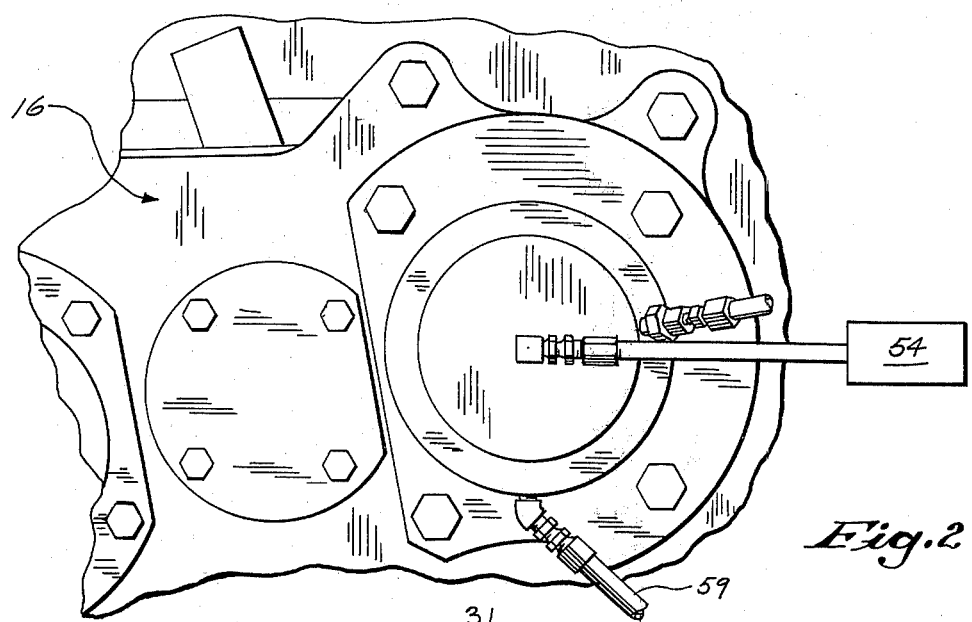
FIG. 2 is an enlarged fragmentary side elevation of the crawler drive mechanism of FIG. 1.
Figure 4:
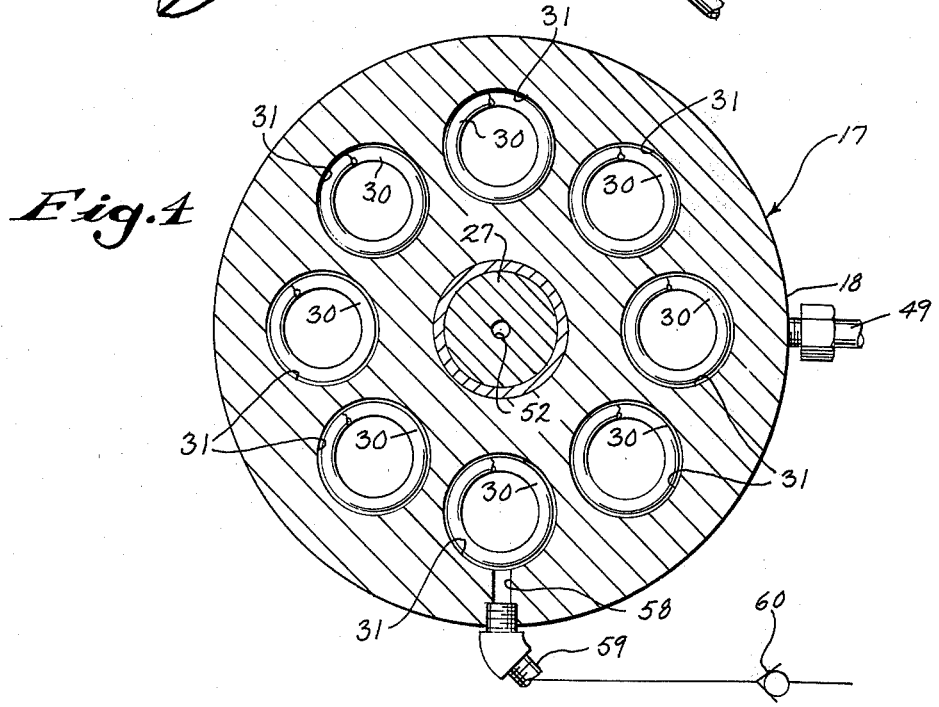
FIG. 4 is a transverse section of the brake spring assembly taken on line 4—4 of FIG. 3.
Figure 3:
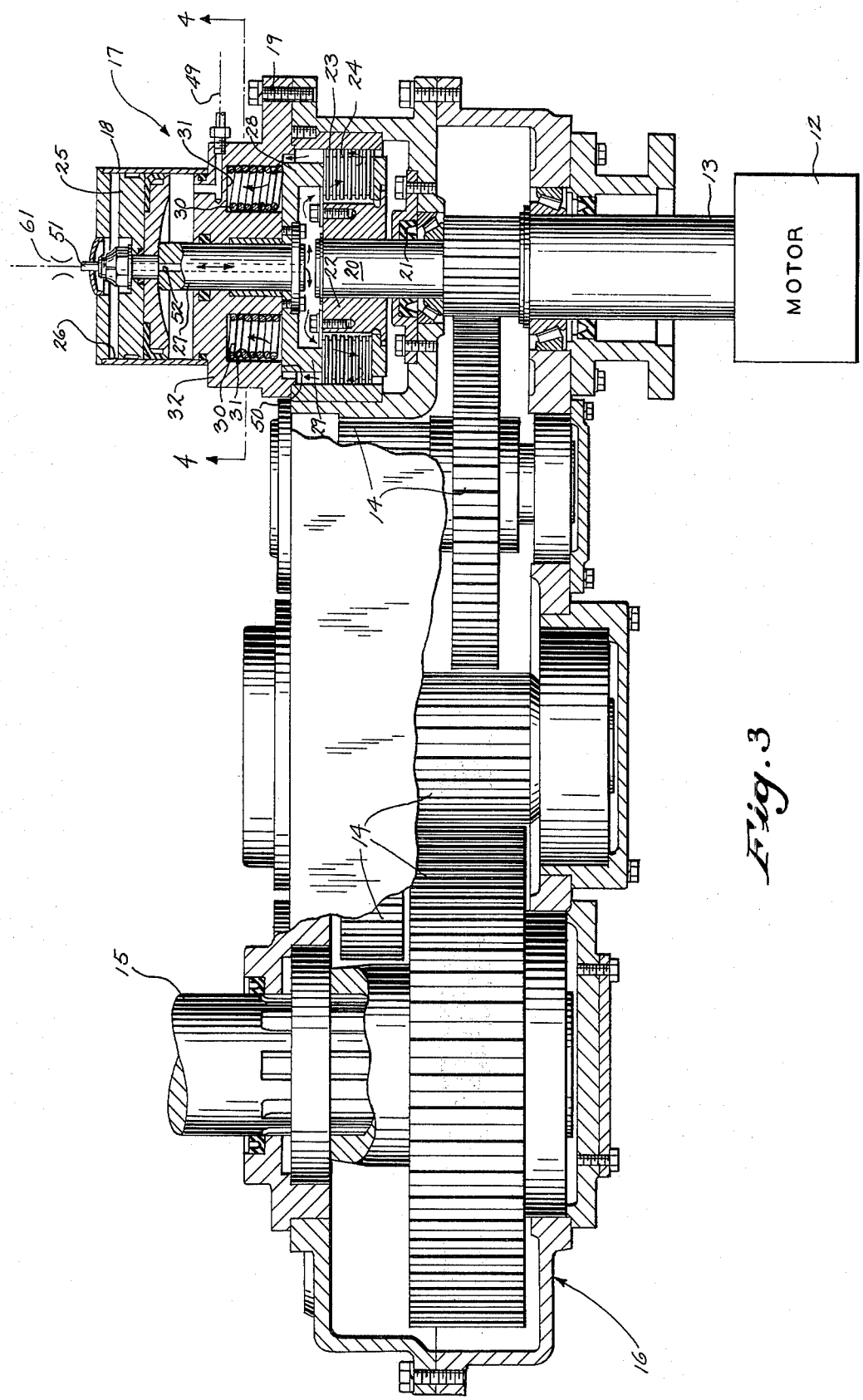
FIG. 3 is a horizontal section taken on line 3—3 of FIG. 1.

The crane-excavator includes means to drive crawler treads 1 in either direction. For this purpose, and as best shown in FIGS. 2-4, a hydraulically actuated travel function motor 12 is mounted on the framework of the device. Motor 12 is connected to a rotatable drive shaft 13 mounted on a horizontal axis and which in turn connects through a chain of gears 14 to an idler shaft 15 for crawler treads 1. Shaft 13 and gear chain 14 are disposed in a gear box housing 16 containing the usual bearings.

The invention contemplates the utilization of a fail-safe brake 17 and in the embodiment shown, a closed brake housing 18 is secured to gear box housing 16, as by bolts 19 and receives the extended inner end portion 20 of drive shaft 13. A suitable annular seal 21 is disposed about shaft 13 adjacent the junction between housings 16 and 18.

A mounting ring 22 is keyed to shaft end portion 20 and carries brake drive plate elements 23. Friction disc elements 24 are disposed between drive plates 23 and are suitably keyed to brake housing 18. Elements 23 and 24 form the actual brake assembly which is longitudinally slidable within the inner brake housing portion.

Brake 17 is of the type which is normally engaged, but is disengaged upon the application of power. For this purpose, a disc-like piston 25 is slidably disposed in a chamber 26 formed in the outer end portion of housing 18; and carries an inwardly extending piston rod 27 which is coaxial with drive shaft 13. The inner end portion of rod 27 forms the mounting for a pressure plate 28 having an annular peripheral flange 29 which is engageable with the outermost portion of the brake assembly.

Pressure plate 28 is continuously biased inwardly toward brake engaging position by annular spring means disposed about the rod-shaft axis, which in the present embodiment comprises a plurality of circumferentially spaced coil springs 30, each of which is mounted in a separate independent longitudinal spring pocket 31 horizontally disposed in a support 32 forming a radially inward extension of brake housing 18. Springs 30 extend from the base of their respective pockets and into biasing engagement with pressure plate 28. Biasing of plate 28 axially inwardly shifts piston 25 in the same direction within chamber 26.

Figure 5:
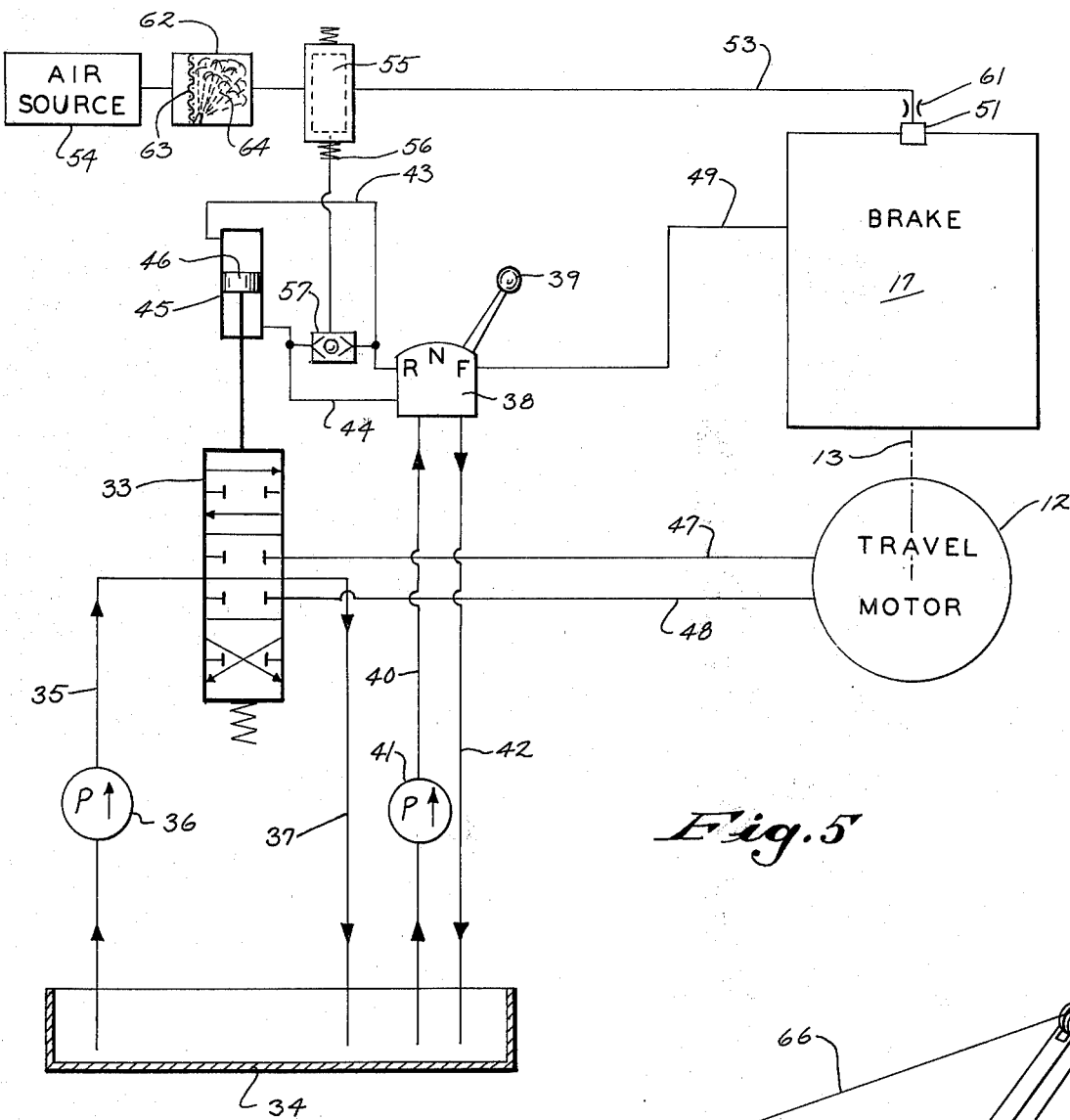
FIG. 5 is a schematic circuit diagram for the embodiment of FIG. 1.

FIG. 5 shows the means for operator controlled release of brake 17. For this purpose, a hydraulic metering spool valve 33 is connected to a source of oil in a tank or sump 34 by a fluid supply line 35 having a pump 36 therein, and a drain line 37. A manual control valve 38 of any suitable well-known type and having a lever 39 is disposed in the operator's cab 4 and is also connected to sump 34 by a supply line 40 with pump 41 and a drain line 42. Valve 38 is connected by lines 43, 44 to a double acting control cylinder 45 whose piston 46 is connected to the spool of valve 33 to move the latter between neutral and forward or reverse motor drive positions and thereby drive travel motor 12 through lines 47 and 48, as well as shaft 13.

An additional line 49 is connected to control valve 38 and extends to brake piston chamber 26 on the inward side of piston 25. Whenever valve 38 is shifted from neutral to forward or reverse, line 49 is pressurized to apply an axially outwardly directed force against the piston to overcome springs 30 and release the brake simultaneous with entry into travel mode. Pressure plate 28 will move axially away from the brake assembly, limited only by an annular stop shoulder 50 disposed radially outwardly from spring pockets 31. When valve 38 is placed in neutral, line 49 will drain back through the valve to sump 34 so that the brake reengages.

Control valve lever 39 is shown only schematically and may be either hand or foot operated. Furthermore, the lever may be biased toward neutral to provide a dead man type of control.

While the circuitry described and illustrated is hydraulic, air or any other type of fluid could be utilized with one or more parts thereof without departing from the spirit of the invention.

In accordance with the invention, a closed system is provided to equalize the air pressure on both sides of brake piston 25. This system also acts to purge the interior of the brake housing of contaminants. Furthermore, in the embodiment shown, the system also lubricates the brake mechanism. For this purpose, and as best illustrated in FIGS. 3 and 5, a port 51 is disposed in the wall of brake housing 18 and communicates with chamber 26 on the outer longitudinal side of piston 25. In addition, an axial passage 52 extends the full length of piston rod 27, thus placing the chambers at both ends of the piston and rod assembly in free and open communication.

Port 51 is connected through a pneumatic line 53 to a suitable source of pressurized air, shown schematically at 54. Since it is desirable to provide pressurized air to the brake only when the controls are in the travel mode and the brake released, a spool type on-off shuttle valve 55 of any suitable well-known type is inserted in line 53. As shown, valve 55 is spring biased into neutral position, wherein the downstream side of line 53 is unpressurized and open to atmosphere. However, the construction is such that shuttle valve 55 is directly responsive to placing of the primary circuitry into travel mode, with brake 17 released. In the present embodiment, valve 55 is responsive to hydraulic fluid in control cylinder 45 through a line 56 and a double acting check valve 57 connected to line 56 and between both sides of piston 46 (i.e., between lines 43 and 44). Thus, whenever piston 46 is actuated, shuttle valve 55 will automatically and simultaneously be shifted to connect air source 54 with port 51.

An air discharge passage 58 in the wall of brake housing 18 connects the interior thereof with an exhaust line 59 having a suitable one-way check valve 60 therein. Valve 60 seals the brake mechanism against undesirable reverse flow entry of water or other contaminants.

When shuttle valve 55 is actuated, pressurized air will flow into the outer brake housing chamber 26, through piston rod 27 to the opposite side of the piston, and hence circulatingly through the brake assembly elements 23, 24 and to springs 30, and then out through exhaust passage 58, as shown by the arrows. Any corrosion or particles within the brake, or any foreign matter which might have leaked into the brake through shaft seal 21 will be purged from the system by the air flow. A suitable controllable orifice 61 is disposed at port 51 to maintain the desired system pressure. In addition, the air volume must be within the capacity of the air supply means to maintain the air flow.

To provide the maximum amount of purging possible, discharge passage 58 should be disposed adjacent the lowermost or bottom spring pocket 31 where internal contaminants will tend to collect due to gravity. See FIG. 4. Purging of all spring pockets will occur due to air turbulence.

It is desirable that the air passing through housing 18 be as free from contaminants as possible. In addition, brake systems of the type under consideration here usually need lubrication and/or cleaning from time to time. For this purpose, conditioning unit 62 is disposed in air line 53 upstream of housing 18, preferably between source 54 and shuttle valve 55. Unit 62 is shown as having an air filter 63 of any suitable type. In addition, lubricant or cleaner such as oil or alcohol is injected into the air in the form of a fine spray or mist 64, and is carried into contact with the brake parts.

While the previously described embodiment has only referred to a single crawler brake, more than one crawler brake incorporating the purging system may be utilized on the same machine to advantage.

Figure 6:
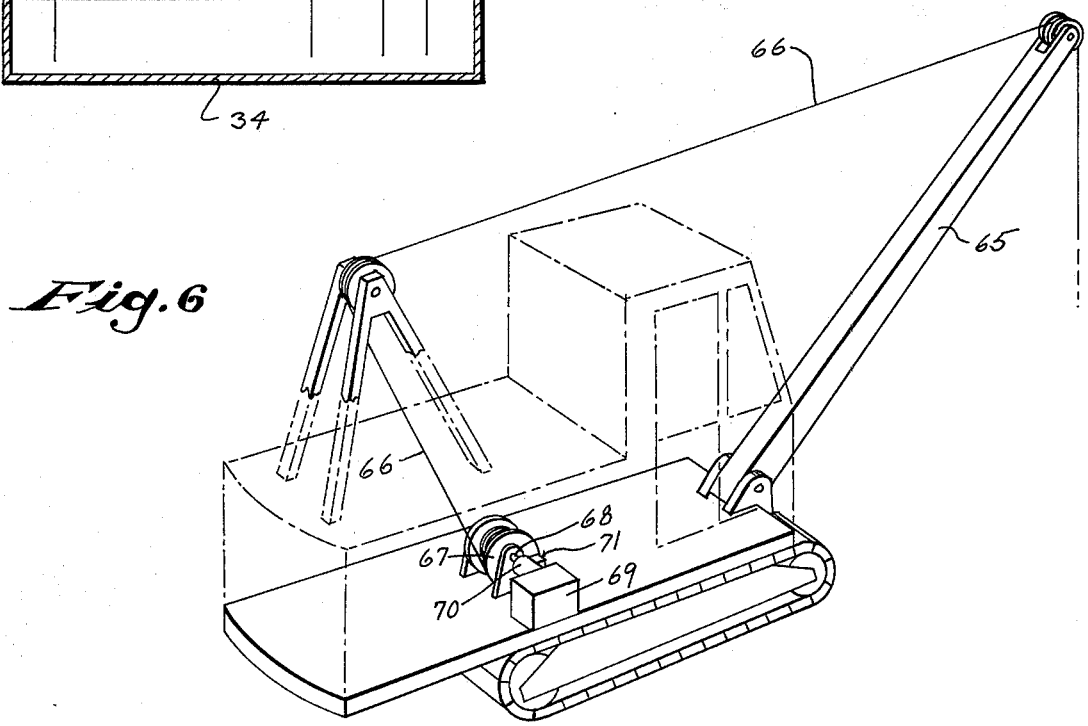
FIG. 6 is a schematic perspective view of a crane incorporating the invention.

The concept of the invention may also be used in connection with a fail-safe brake connected to the winch control for a boom cable. As shown schematically in FIG. 6, a crane includes a boom 65, a cable 66 thereon, a cable drum 67 and drum shaft 68. Shaft 68 is driven by a function motor 69 and includes a fail-safe brake 70 thereon which is of the same general type as in the first embodiment. An air purging shuttle valve 71 is connected to brake 70. The other controls may be structurally similar to those previously described, or modified to make greater use of pneumatics and the like. In any event, actuation of the winch will release brake 70 and actuate the air purging system.

Various modes of carrying out the invention are contemplated as being within the scope of the following claims particularly pointing out and distinctly claiming the subject matter which is regarded as the invention.

I claim:
1. In a material handling machine having a drive shaft:
  a. a closed housing receiving at least the inner end portion of said shaft,
  b. disc brake means extending between said shaft and said housing,
  c. a pressure plate disposed within said housing and engaging said brake means,
  d. a piston disposed in a chamber disposed at one end of said housing and with said piston having a rod coaxial with said drive shaft and mounted to said pressure plate.
e. a plurality of circumferentially spaced springs with each spring disposed in an independent recess within said housing and with said springs biasing said pressure plate to normally engage said brake means,
f. means to pressurize the inner portion of said chamber to move said piston and pressure plate outwardly to thereby release said brake,
g. and means to purge the interior of said brake housing, said last-named means comprising:
1. an air inlet passage extending through said housing and piston rod,
2. an air discharge passage disposed in said housing and connected with the lowermost of said recesses,
3. and means to provide pressurized air to said inlet passage so that air flows through said disc brake means and recesses and out through said discharge passage.

* * * * *